US007581397B2

(12) United States Patent
Strangman et al.

(10) Patent No.: US 7,581,397 B2
(45) Date of Patent: Sep. 1, 2009

(54) DIFFUSER PARTICLE SEPARATOR

(75) Inventors: Thomas E. Strangman, Prescott, AZ (US); Mark C. Morris, Phoenix, AZ (US); William C. Baker, Phoenix, AZ (US); Harry L. Kington, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 691 days.

(21) Appl. No.: 11/213,125

(22) Filed: Aug. 26, 2005

(65) Prior Publication Data

US 2007/0235373 A1 Oct. 11, 2007

(51) Int. Cl.
*F02C 1/00* (2006.01)
*F02G 3/00* (2006.01)
*F03B 11/08* (2006.01)

(52) U.S. Cl. .................... 60/751; 60/39.092; 415/121.2

(58) Field of Classification Search .............. 60/39.092, 60/751; 415/121.2, 169.1, 144, 145, 208.3, 415/208.4

See application file for complete search history.

(56) References Cited

U.S. PATENT DOCUMENTS 3,228,190 A 1/1966 Brown
3,338,049 A 8/1967 Fernberger
4,047,912 A * 9/1977 Markland .................... 55/406
4,265,646 A * 5/1981 Weinstein et al. ............ 55/306
4,292,050 A * 9/1981 Linhardt et al. ............... 95/269
4,463,552 A 8/1984 Monhardt et al.
4,544,382 A * 10/1985 Taillet et al. .................. 96/27
4,617,028 A * 10/1986 Ray et al. ..................... 95/267
4,860,534 A 8/1989 Easley et al.
4,928,480 A 5/1990 Oliver et al.
5,039,317 A 8/1991 Thompson et al.
5,123,240 A * 6/1992 Frost et al. .................... 60/779
5,167,932 A * 12/1992 Ruottu ....................... 422/146
5,339,622 A 8/1994 Bardey et al.
6,508,052 B1 1/2003 Snyder et al.
6,572,685 B2 6/2003 Dunshee
2005/0034464 A1 2/2005 Gonzalez

* cited by examiner

*Primary Examiner*—Michael Cuff
*Assistant Examiner*—Gerald L Sung
(74) *Attorney, Agent, or Firm*—Ingrassia Fisher & Lorenz, P.C.

(57) ABSTRACT

A diffuser particle separator may be integrated into a gas turbine engine to remove corrosive dust and salt particles from the engine's core air flow. The air flow may pass over a series of particle accumulator entrance orifices, trapping particles in a particle accumulator while allowing the air flow to continue unimpeded. Since dust deposits may become molten at high temperatures, removal of dust from the core and secondary airflow may be critical for long-life superalloy and ceramic components, particularly those with small diameter air-cooling holes and thermal barrier coatings.

24 Claims, 5 Drawing Sheets

DIFFUSER PARTICLE SEPARATOR

BACKGROUND OF THE INVENTION

The present invention generally relates to apparatus and methods for providing clean core air in an engine and, more specifically, to apparatus and methods for separating particles from diffuser air.

Corrosive dust and salt particle deposits may be responsible for hot corrosion in the turbine and blockage of air-cooling passages (effusion cooling holes) in the combustion liner and internal cooling passages in turbine airfoils. Removal of dust from the core airflow is required to significantly improve turbine and combustor durability.

For example, as turbine inlet temperatures continue to increase to improve the efficiency of modern gas turbine engines, a large number of small cooling holes are required along combustor liners and turbine airfoils to cool the components. These small cooling holes can plug with dust particles, reducing the effectiveness of the cooling and causing oxidation and thermal-mechanical fatigue. Distress may also be observed on high performance turbine stator and blade leading edges and airfoil pressure side surfaces due to glass deposits on the thermal barrier coating (TBC). The dust particles may melt and wick into the TBC, reducing the compliance of the TBC micro-structure. The result may be spallation of the TBC coating which may elevate the airfoil metal temperatures and cause oxidation and thermal-mechanical fatigue distress.

U.S. Pat. No. 4,463,552, issued to Monhardt et al., discloses that a surge valve in the compressor may be used to remove dirt from the air flowpath. The surge valve is placed between the low and high pressure compressor, diverting dust into the bypass air. The '552 patent, however, does not disclose apparatus or methods for removing particles from an air flow within the diffuser or at the exit of the diffuser.

U.S. Pat. No. 3,338,049, issued to Fernberger, describes a particle separator in front of the inlet to the compressor. This separator has an inflatable inner wall to alter air flow and divert particles into a bypass duct. The '049 patent, however, does not disclose apparatus or methods for removing particles from an air flow within or at the exit of the diffuser.

As can be seen, there is a need for improved methods and apparatus to improve the air quality in the core of gas turbine engines for improved durability.

SUMMARY OF THE INVENTION

In one aspect of the present invention, a diffuser particle separator, comprises a diffuser-deswirler for moving an air flow through an engine; at least one particle accumulator entrance orifice impinged by the air flow; a particle accumulator in communication with the particle accumulator entrance orifice for collecting and removing particles from the air flow; and a purge air duct for transporting accumulated particles out of an engine core.

In another aspect of the present invention, a diffuser particle separator comprises a hollow toroidal-shaped particle accumulator located in a diffuser-deswirler air flow just downstream from the exit of a diffuser-deswirler; and a plurality of particle accumulator entrance orifices communicating an exterior of the particle accumulator with an interior portion thereof; and a purge air duct for transporting accumulated particles out of an engine core.

In yet another aspect of the present invention, a diffuser particle separator comprises a set of particle accumulator entrance orifices formed through an inner wall of a diffuser-deswirler; and a particle accumulator in communication with the set of particle accumulator entrance orifices for collecting and removing particles from an air flow through the diffuser-deswirler; and a purge air duct for transporting accumulated particles out of an engine core.

In a further aspect of the present invention, a gas turbine engine comprises a diffuser-deswirler for carrying core air flow to the exterior of a combustor liner; at least one particle accumulator entrance orifice within the air flow; and a particle accumulator in communication with the particle accumulator entrance orifice for collecting and removing particles from the air flow; and a purge air duct for transporting accumulated particles out of an engine core.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an inertial and/or electronic particle separator located in a diffuser or at the exit of a diffuser of a gas turbine engine. The diffuser particle separator may capture and remove salt and dust particles from the core airflow. This efficient means of dust collection may improve component environmental life while reducing thermal-mechanical fatigue distress on components such as the combustion liner and turbine airfoils. The apparatus of the present invention may be useful on any turbine engine, including those found in aircraft, ground vehicles, generators and other industrial gas turbine engines.

Unlike conventional turbine engine particle removal systems which are located at various other locations of the engine, the diffuser particle separator according to the present invention may remove particles immediately prior to entry into the combustor plenum and secondary airflow cooling passages.

Figure 1:
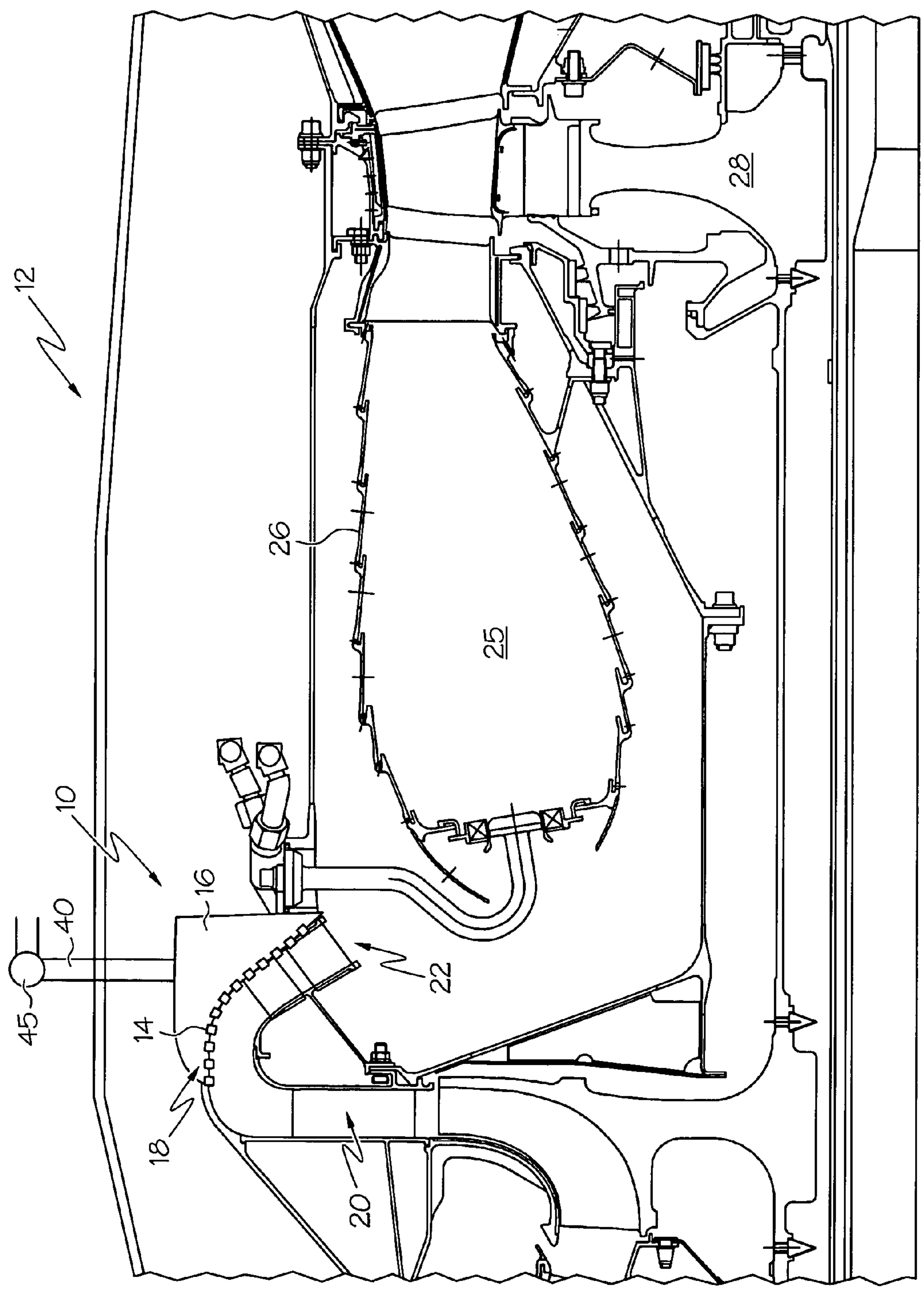
FIG. 1 is a cross-sectional view showing a diffuser particle separator according to one aspect of the present invention integrated into a turbine engine.

Referring to FIG. 1, there is shown a cross-sectional view showing a diffuser particle separator 10, according to one aspect of the present invention, integrated into a turbine engine 12. Diffuser particle separator 10 may include at least one particle accumulator entrance orifice 14 and a particle accumulator 16 in communication with the particle accumulator entrance orifice 14. Turbine engine 12 may include a combustor 25 having a combustor lining 26 upstream of a high pressure turbine rotor 28. In one embodiment of the present invention, as shown in FIG. 1, the particle accumulator entrance orifices 14 may be cut into an outer wall 18 of a diffuser 20 near a diffuser-deswirler exit 22. The diffuser particle separator 10 may be designed to enable particles in the airflow to impinge on the particle accumulator entrance orifices 14 and be captured for removal in the particle accumulator 16. The particle accumulator 16 may be connected to a purge air duct 40 which may vent to a low pressure sink such as the fan duct or outside of the engine. The flow through the purge air duct 40 may be metered by use of a purge valve 45.

The particle accumulator entrance orifices 14 may be prepared from a screen (not shown) affixed over a hole in the diffuser 20. Alternatively, particle accumulator entrance orifices 14 may be formed of holes or slots cut into a section of the diffuser outer wall 18. For example, the particle accumulator entrance orifices 14 may be laser-machined or electrical discharged machined (EDMed) through the diffuser outer wall 18. In either case, particle accumulator entrance orifices 14 may be formed to allow dust and other particles to impinge on the surface of the particle accumulator entrance orifices 14 and pass therethrough into the particle accumulator 16. The particle accumulator entrance orifices 14 may have an average width of 0.005 to 0.05 inches.

Figure 2:
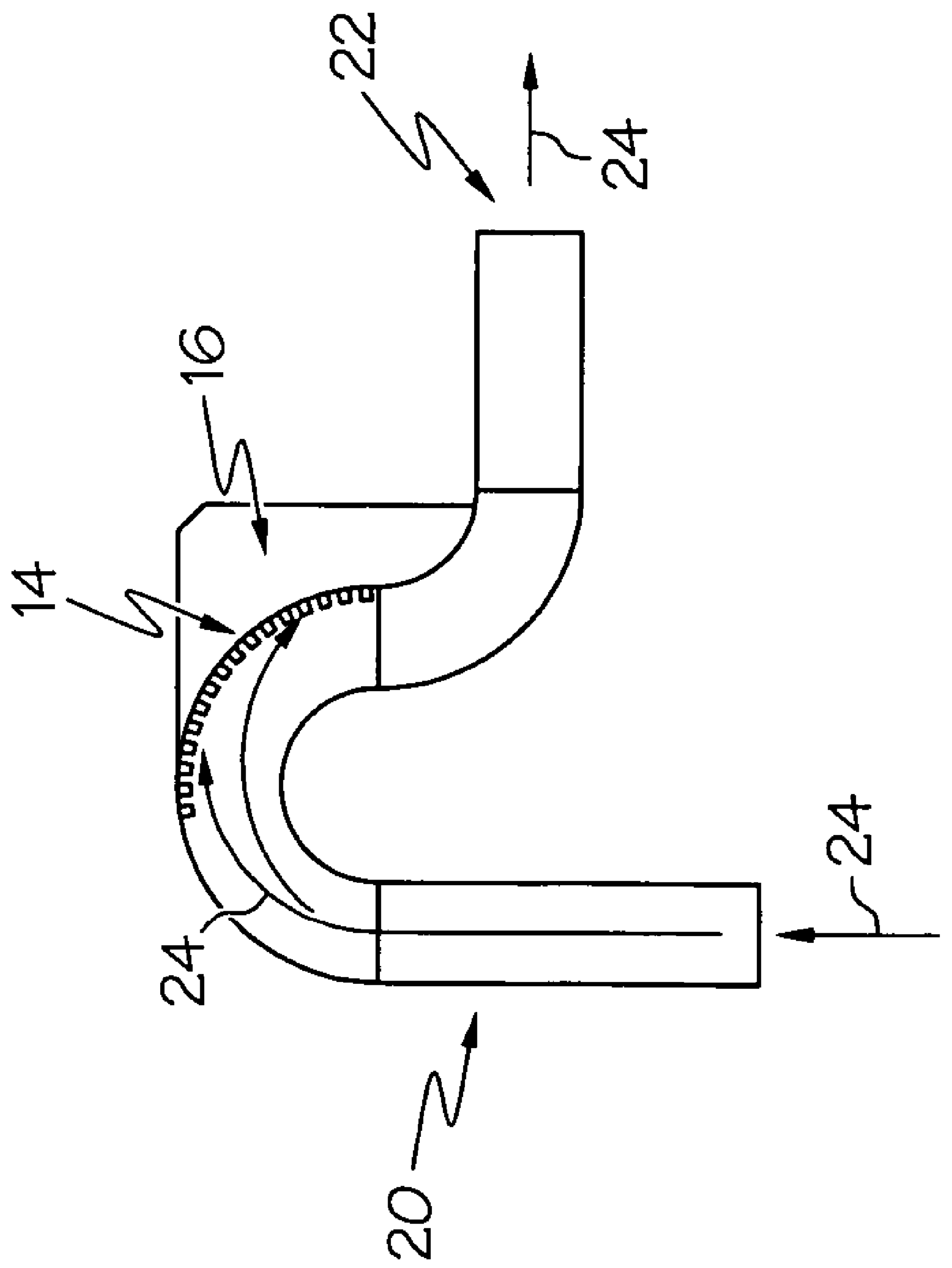
FIG. 2 is a side view of the diffuser particle separator of FIG. 1.

Referring now to FIG. 2, there is shown a side view of an isolated diffuser particle separator 10 of FIG. 1. Arrows 24 show the airflow through the diffuser 20, over the particle accumulator entrance orifices 14 and out of the diffuser-deswirler exit 22. Particle accumulator 16 may be used to accumulate particulate matter from the airflow through diffuser 20.

Figure 3:
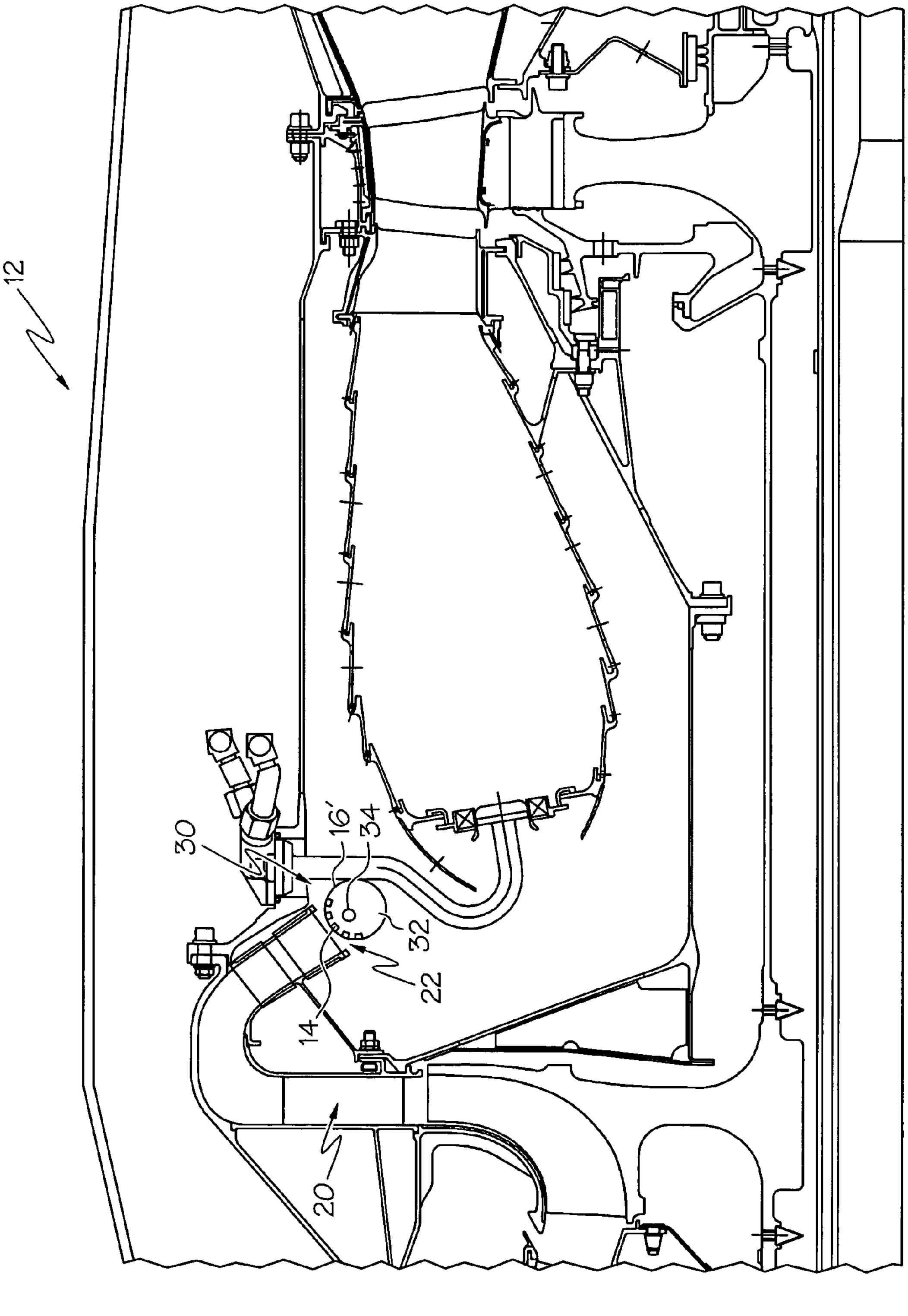
FIG. 3 is a cross-sectional view showing a diffuser particle separator according to another aspect of the present invention integrated into a turbine engine.

Referring to FIG. 3, there is shown a cross-sectional view showing a diffuser particle separator 30, according to another aspect of the present invention, integrated into a turbine engine 12. Diffuser particle separator 30 may include at least one particle accumulator entrance orifice 14 and a particle accumulator 16' in communication with the particle accumulator entrance orifice(s) 14. In this embodiment of the present invention, particle accumulator entrance orifices 14 may be located just beyond the diffuser-deswirler exit 22. The particle accumulator 16' may be a hollow toroidal-shaped accumulator with localized perforations (particle accumulator entrance orifices 14) communicating an exterior of the particle accumulator 16' with an interior portion 32 thereof. Other hollow non-toroidal shapes may be configured for non-annular diffusers such as pipe diffusers.

Interior portion 32 of particle accumulator 16' may also include an electrically charged rod 34. Since a significant amount of dust exiting the diffuser 20 may be electrically charged, the efficiency of the diffuser particle separator 10 may be enhanced by creating an electrical field, e.g., via electrically charged rod 34, within the particle accumulator 16'. The shape of particle accumulator 16' may have an aerodynamic contour to minimize any effect on engine performance. A purge air duct, not shown, transports accumulated particles out of the engine core.

Figure 4:
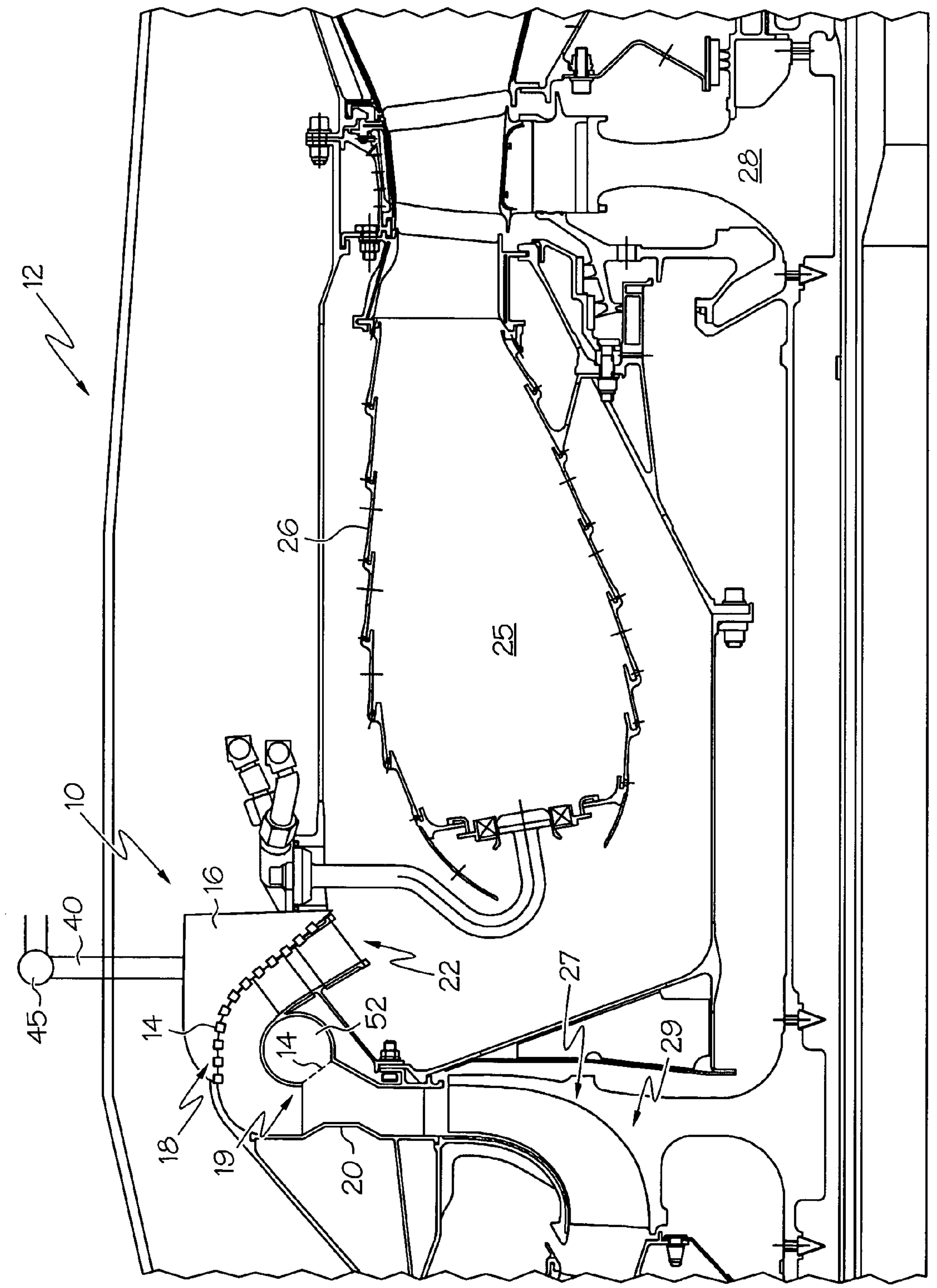
FIG. 4 is a cross-sectional view of a diffuser particle separator at a diffuser inner wall according to another aspect of the present invention.

FIG. 4 shows a variation of the diffuser particle separator located in a diffuser inner wall 19. The natural contour of the centrifugal impeller 29 may force particulates along an impeller inner wall 27. The diffuser may be aerodynamically designed to force particulates along the diffuser inner wall 19 where particles may be collected in a diffuser particle separator accumulator 52. The diffuser particle separator along the diffuser inner wall 19 may be used independently or in conjunction with a diffuser particle separator along an outer wall 18. A purge air duct, not shown, transports accumulated particles out of the engine core.

Figure 5:
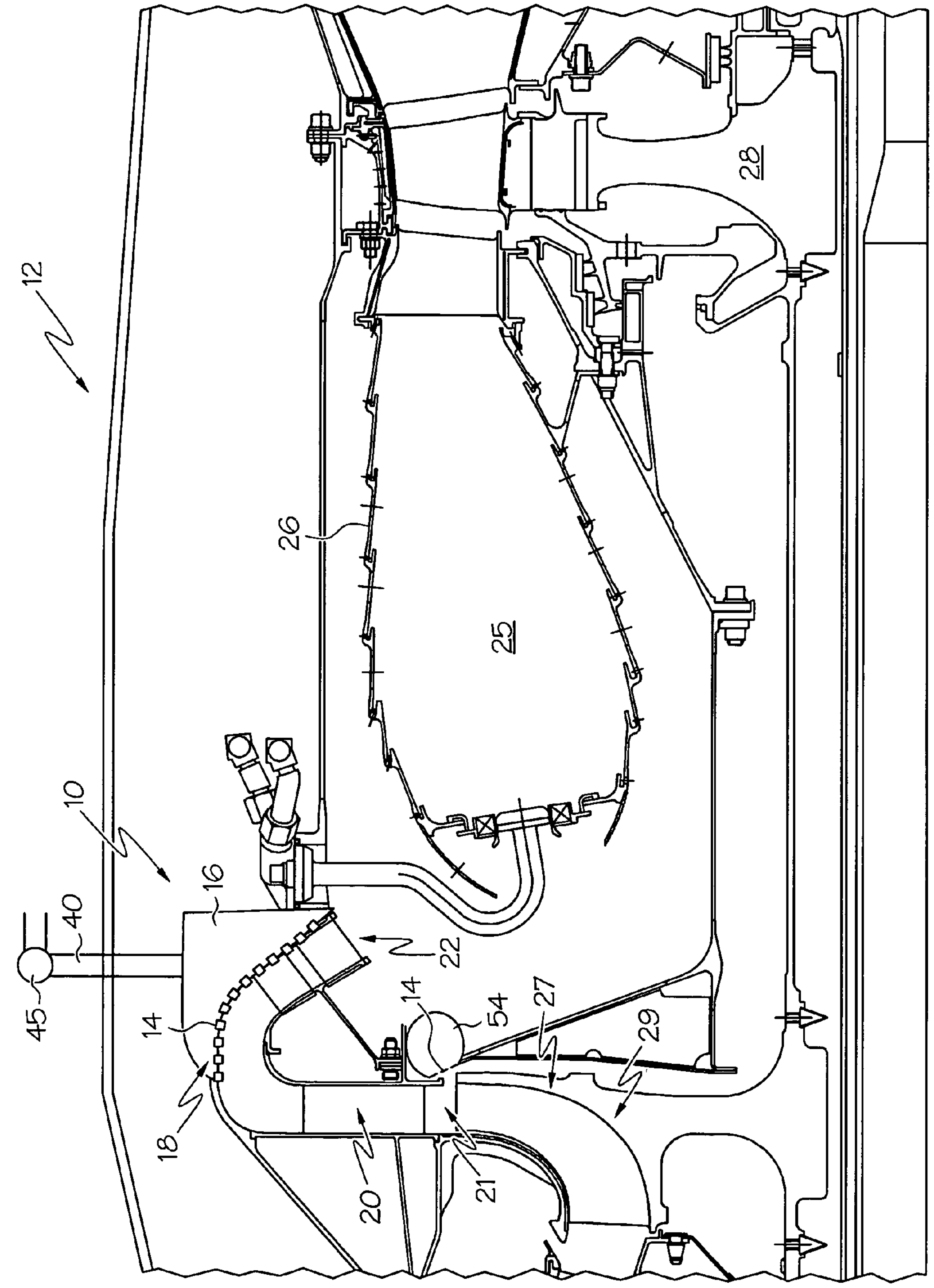
FIG. 5 is a cross-sectional view of a diffuser particle separator at a diffuser inlet according to another aspect of the present invention.

FIG. 5 shows another variation of a diffuser particle separator which is located at the diffuser inlet 21. The natural contour of the centrifugal impeller 29 may force particulates along an impeller inner wall 27. A diffuser particle separator accumulator 54 may be located at the diffuser inlet 21 just above and aft of the centrifugal impeller 29 to collect any particles that may be flowing in a secondary cooling flow that may proceed down the aft face of the impeller 29. The diffuser particle separator located at the diffuser inlet 21 may be used independently or in conjunction with a diffuser particle separator along an outer wall 18 or in conjunction with a diffuser particle separator along an inner wall 19, as previously described with reference to FIG. 4. A purge air duct, not shown, transports particles captured in accumulator 54 out of the engine core.

The particle accumulators 16,16', 52, and 54 may be cleaned with a purge flow of air activated at engine idle. At other duty cycle power points of the engine 12, utilization of purge flow may be optional. Purging of the accumulator utilizing various flow rates may be accomplished at high particulate ingestion operating conditions to improve particle separator efficiency. Purge flow rates may be metered at the desired level using the purge valve 45. Purge air flow need not be utilized during performance critical operating conditions.

By means of a non-limiting example, one may assume that the rate of deposition of corrosive salt and dust onto combustor and turbine airfoil surfaces may be dependent upon the amount of particulate contaminants in the core air flow. A 70% efficient inertial/electronic particle separator may approximately triple the lives of components that are currently life-limited by deposition of corrosive dust. Performance penalties may be avoided by using core airflow to purge the particle accumulator (16, 16', 52, and 54) when the engine is at idle or other non-performance-critical operating condition. In addition, the purge valve 45 may be closed to obtain optimal engine performance during take-off and at operating conditions that do not experience dust/salt environments, such as high altitude cruising.

The diffuser particle separator 10 may be made of a titanium alloy or of an oxidation-resistant steel or a nickel-base or cobalt-base superalloy. A hard, oxidation resistant coating, such as (Ti, Al, Zr)N, may be used to increase the erosion life of diffuser particle separator 10. The diffuser particle separator 10 may be made with ceramic or ceramic matrix composite materials.

It should be understood, of course, that the foregoing relates to exemplary embodiments of the invention and that modifications may be made without departing from the spirit and scope of the invention as set forth in the following claims.

We claim:

1. A diffuser particle separator within a turbine engine core, comprising:

a diffuser-deswirler moving an air flow through an engine from the discharge of a compressor;

at least one particle accumulator entrance orifice located directly upstream from a combustor and downstream from the compressor discharge, the at least one particle accumulator entrance orifice being impinged by the air flow;

a particle accumulator in fluid communication with the particle accumulator entrance orifice, the particle accumulator accumulating and removing particles from the air flow; and a purge air duct in fluid communication with the particle accumulator, the purge air duct transporting the accumulated particles out of the engine core.

2. The diffuser particle separator according to claim 1, wherein the at least one particle accumulator entrance orifice comprises a plurality of particle accumulator entrance orifices formed along a wall of the diffuser.

3. The diffuser particle separator according to claim 1, wherein one of the diffuser-deswirler and the diffuser particle separator is made of a titanium alloy and one of an oxidation-resistant steel, a nickel-based superalloy and a cobalt-based superalloy.

4. The diffuser particle separator according to claim 1, wherein the diffuser particle separator is made with one of a ceramic and ceramic matrix composite material.

5. The diffuser particle separator according to claim 1, wherein the at least one particle accumulator entrance orifice is formed through the wall of a hollow toroidal-shaped particle accumulator.

6. The diffuser particle separator according to claim 5, wherein the particle accumulator is located just beyond the diffuser-deswirler exit.

7. The diffuser particle separator according to claim 5, further comprising an electrically charged electrode positioned within the particle accumulator.

8. The diffuser particle separator according to claim 1, wherein each particle accumulator entrance orifice width ranges from 0.005 to 0.05 inches.

9. The diffuser particle separator according to claim 1, further comprising a purge air valve for controlling an air flow through the purge air duct.

10. A diffuser particle separator within a turbine engine core comprising:

a hollow toroidal-shaped particle accumulator located in a diffuser-deswirler air flow located directly upstream from a combustor.

a plurality of particle accumulator entrance orifices formed through a surface of the accumulator which is impinged by the diffuser-deswirler air flow, the orifices communicating an exterior of the particle accumulator with an interior portion thereof and allowing particles to pass into the accumulator; and a purge air duct connecting the interior of accumulator to the atmosphere, the purge air duct transporting accumulated particles out of the engine core.

11. The diffuser particle separator according to claim 10, further comprising an electrically charged rod positioned within the particle accumulator.

12. The diffuser particle separator according to claim 10, wherein each of the plurality of particle accumulator entrance orifice widths ranges from 0.005 to 0.050 inches.

13. A diffuser particle separator within a turbine engine core comprising:

a first set of particle accumulator entrance orifices formed through an inner wall portion of a diffuser-deswirler, the diffuser-deswirler being located directly upstream from a combustor;

a first particle accumulator in fluid communication with the first set of particle accumulator entrance orifices, the accumulator collecting and removing particles from an air flow passing through the diffuser-deswirler; and a purge air duct connecting the first particle accumulator with the atmosphere, the purge air duct transporting accumulated particles out of the engine core.

14. The diffuser particle separator according to claim 13, wherein the first set of particle accumulator entrance orifices is located upstream of a bend in the diffuser-deswirler prior to a diffuser-deswirler exit.

15. The diffuser particle separator according to claim 13, wherein the first set of particle accumulator entrance orifices is located at a diffuser-deswirler inlet.

16. The diffuser particle separator according to claim 13, further comprising:

a second set of particle accumulator entrance orifices formed through an outer wall portion of the diffuser near a diffuser-deswirler exit;

a second particle accumulator in fluid communication with the second set of particle accumulator entrance orifices, the second accumulator collecting and removing particles from an air flow through the diffuser; and a second purge air duct connecting the second particle accumulator with the atmosphere, the second purge air duct transporting accumulated particles out of an engine core.

17. A diffuser particle separator within a turbine engine core comprising:

a first set of particle accumulator entrance orifices directly upstream from a combustor and formed through an outer wall portion of the diffuser particle separator near an exit of a diffuser-deswirler exit;

a first particle accumulator in fluid communication with the first set of particle accumulator entrance orifices, the first particle accumulator collecting and removing particles from an air flow through the diffuser deswirler; and a purge air duct connecting the first particle accumulator with the atmosphere, the purge air duct transporting accumulated particles out of the engine core.

18. The diffuser particle separator according to claim 17, further comprising:

a second set of particle accumulator entrance orifices formed through an inner wall portion of a diffuser-deswirler; and a second particle accumulator in fluid communication with the second set of particle accumulator entrance orifices, the second particle accumulator collecting and removing particles from an air flow through the diffuser-deswirler.

19. A gas turbine engine comprising the diffuser particle separator according to claim 1.

20. The gas turbine engine according to claim 19, wherein the at least one particle accumulator entrance orifice is a plurality of particle accumulator entrance orifices formed through a wall in the diffuser-deswirler.

21. The gas turbine engine according to claim 19, wherein the at least one particle accumulator entrance orifice is formed through the wall of a toroidal-shaped particle accumulator.

22. The gas turbine engine according to claim 21, wherein the particle accumulator is located just beyond the diffuser-deswirler exit, wherein airflow from the diffuser may impinge upon the at least one particle accumulator entrance orifice.

23. The gas turbine engine according to claim 21, further comprising an electrically charged electrode positioned within the particle accumulator.

24. The gas turbine engine according to claim 19, wherein each particle accumulator entrance orifice width is from 0.005 to 0.05 inches.

* * * * *

UNITED STATES PATENT AND TRADEMARK OFFICE

CERTIFICATE OF CORRECTION

PATENT NO. : 7,581,397 B2 Page 1 of 1
APPLICATION NO. : 11/213125
DATED : September 1, 2009
INVENTOR(S) : Strangman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this

Fourteenth Day of September, 2010

David J. Kappos
*Director of the United States Patent and Trademark Office*